Patented Apr. 6, 1943

2,316,079

UNITED STATES PATENT OFFICE 2,316,079

LUBRICANT

Clarence M. Loane, Hammond, Ind., and James W. Gaynor, Chicago, Ill., assignors to Standard Oil Company, Chicago, Ill., a corporation of Indiana No Drawing. Application March 24, 1941, Serial No. 384,937

32 Claims. (Cl. 252—48)

This invention relates to lubricants and particularly to improvements in lubricating oil compositions intended for use in internal combustion engines such as automobile and Diesel engines under severe conditions wherein corrosion, piston ring sticking, cylinder wear, carbon, and "varnish" formation may be encountered.

Straight petroleum lubricants are effective within certain defined limits of engine operating conditions and when these limits are exceeded, such lubricants frequently fail to give the desired performance demanded of them. Since, in modern engines designed to give increased performance these limits are frequently exceeded, the use of straight mineral oils as lubricants produces undesirable conditions within the engine; thus "varnish" and carbon formation is excessive, and corrosion of improved hard metal alloy bearings is encountered.

It is an object of the present invention to provide a lubricant for internal combustion engines which will be effective in providing adequate lubrication for such engines.

It is a further object of the invention to provide a lubricant which will not be inducive to the formation of "varnish" and/or carbon. Another object of the invention is to provide a lubricant which will reduce engine wear, be non-corrosive to bearings, and prevent ring sticking. Other objects and advantages of the invention will become apparent as the description thereof proceeds.

We have discovered a new and novel composition of matter which when added to a lubricating oil in amounts of from about 0.001% to about 10%, and preferably from about 0.01% to about 3%, produces a lubricant having the foregoing desirable properties. This new and novel composition of matter, prepared as hereinafter more fully described, is the product obtained by treating, at an elevated temperature, an olefin polymer, particularly a mono-olefin polymer, of the type hereinafter described, with a basic reagent containing a metal constituent such as, a metal oxide, a metal hydroxide, a metal carbonate, or other suitable metallic compound.

We may also employ the above product in combination with other additives, for example the reaction product of a phosphorus sulfide and an olefin polymer, particularly mono-olefin polymers of the type hereinafter described. From about 0.001% to about 10%, and preferably from about 0.01% to about 3% of this second additive may be used in combination with the above composition of matter in lubricating oils.

The olefin polymer to be treated may be the polymer resulting from the polymerization of low molecular weight olefins, preferably iso-mono-olefins, such as isobutylene and isoamylene and/or the copolymers obtained by the polymerization of hydrocarbon mixtures containing low molecular weight iso-olefins and normal olefins, preferably the iso-mono-olefins and mono-olefins of less than six carbon atoms, and preferably those of four carbon atoms. The polymer may be obtained by the polymerization of these olefins or mixed olefins in the presence of catalysts such as sulfuric acid, phosphoric acid or boron fluoride, aluminum chloride or other similar metal halide catalyst of the Friedel-Crafts type.

The olefin polymers employed are preferably mono-olefin polymers having molecular weights ranging from about 150 to about 50,000 or more, and preferably from about 500 to about 5,000. These polymers can be obtained, for example, by the polymerization in the liquid phase of an iso-olefin, such as isobutylene or hydrocarbon mixtures containing the same at a temperature of from about −80° F. to about 100° F. in the presence of a metal halide catalyst of the Friedel-Crafts type, such as boron fluoride. In the preparation of these polymers we may employ, for example, liquid isobutylene or a hydrocarbon mixture containing isobutylene, butanes, and butylene, recovered from petroleum gases especially those gases produced in the cracking of petroleum oils for the manufacture of gasoline. This light fraction may contain from about 10% to about 25% isobutylene, the remainder being principally butanes and normal butylene.

The preparation of low molecular weight polymers having molecular weights ranging from about 150 to about 2,000 from the butane-butylene-isobutylene fraction may be carried out as follows: The hydrocarbon mixture containing 10% to 25% isobutylene is maintained under pressure sufficient to keep it in the liquid phase and cooled to a temperature of from about 0° F. to about 100° F., and preferably from about 10° F. to about 32° F., and from about 0.1% to about 2% boron fluoride, based upon the isobutylene content of the material treated, is added with vigorous agitation. Excessive rise in the temperature due to the heat of reaction may be avoided by efficient cooling. After the polymerization of the isobutylene together with a relatively minor amount of the normal olefins present, the reaction mass is neutralized, washed free of acidic substances arising from the catalyst, the oily layer separated, and the polymer subsequently separated from the unreacted hydrocarbons by distillation. The polymer mixture so obtained, depending upon the temperature of reaction, varies in consistency from a light liquid to a viscous oily material and contains polymers having molecular weights ranging from about 100 to about 2,000. The polymers so obtained may be employed as such for the hereindescribed purpose, or the polymers may be fractionated under reduced pressure into fractions of increasing molecular weights, for example, a tetramer fraction having a boiling point range between 470° F. and 475° F., a distillate fraction having a Saybolt viscosity at 100° F. of about 150 seconds to about 200 seconds or other desired fractions, and the fractions, or any one of them, employed. The bottoms or residuum resulting from the distillation of the polymer are well suited for the purpose of the present invention. For example, bottoms having Saybolt Universal viscosities at 210° F. of from about 50 seconds to about 10,000 seconds, and preferably above about 80 seconds may be used.

Another source of an olefinic polymer suitable for use in accordance with our invention is a fraction of the polymer obtained in the polymerization of a gaseous hydrocarbon mixture containing isobutylene and normal butylene in the presence of a phosphoric acid catalyst in the synthesis of iso-octane. The polymer may be obtained by subjecting a gas mixture comprising less than $C_6$ hydrocarbons, and preferably $C_4$ olefins and paraffins, to temperatures of about 270° F. to about 430° F., preferably about 300° F. to about 330° F., and at a pressure of from about 500 pounds per square inch to about 750 pounds per square inch, preferably 600 pounds per square inch, in the presence of a catalyst such as phosphoric acid on kieselguhr, diatomaceous earth or the like. The mixed polymer obtained comprises essentially dimer, but contains in addition about 5–10% and usually about 6–7% of heavy polymer comprising trimer, tetramer and still higher polymers. This heavy polymer fraction may be separated and as such be used or it may be still further fractionated to give about 10–15% bottoms, which comprises essentially a tetramer fraction boiling between about 400° F. and about 520° F.

Our new and novel composition of matter may be prepared by admixing a polymer, above described, or a mixture of such polymers with a basic metallic compound, such as a metal oxide, hydroxide, carbonate, acetate or other suitable metal compound, and heating the mixture, preferably in the presence of air, oxygen, or oxygen-containing gas, at a temperature of from about 200° F. to about 500° F., and preferably at about 300° F. to about 400° F. It is preferred to rapidly stir by suitable means the mixture during the heating thereof; for example the mixture may be agitated by means of a suitable stirrer rotating at about 1000 to 5000 R. P. M. Our product may also be prepared by maintaining the mixture at the aforesaid temperature under a pressure of about 2 to about 50 atmospheres while introducing air or oxygen into the mixture. We prefer to employ for the preparation of this new and novel composition of matter an alkali metal or an alkaline earth metal oxide, hydroxide, carbonate or other suitable compound of such metals, and particularly the hydroxides of potassium or sodium. We may, however, employ the oxides, hydroxides, carbonates or other suitable compounds of other metals such as, for example, aluminum, titanium, tin, lead, vanadium, chromium, iron, cobalt, etc.

Under the conditions of preparing our new composition of matter, it is believed that small amounts of acidic products are probably formed which combine with the metal to form soaps. The greater portion of the metal or metal salt in the product is believed to be present in a very stable colloidal or stably dispersed form or to be held in weak chemical combination with some of the non-acidic oxidation products of the polymer.

A specific embodiment of our invention is the following illustrative example: To an isobutylene polymer having a Saybolt Universal viscosity at 100° F. of about 550 seconds was added 20% of powdered KOH and the mixture heated with rapid stirring at a temperature of about 330° F. for about 20 hours. The product was then dissolved in hexane, settled, and filtered, and the filtrate freed of the solvent by blowing with nitrogen. The product so obtained contained about 7% potassium.

The effectiveness of small amounts of the above described material in lubricating oils in increasing the oxidation stability of such oils and in inhibiting the formation of "varnish" is demonstrated by the following test referred to as the "Stirring oxidation test." About 250 cc. of this oil to be tested is heated at about 330° F.–332° F. in a 500 cc. glass beaker in the presence of five square inches of copper and 10 square inches of iron. Four glass rods of about six millimeter diameter are suspended in the oil which is stirred at about 1300 R. P. M. with a glass stirrer having a 40° blade pitch. At stated intervals oil samples are taken and sludge, acidity and viscosity values determined. The glass rods are also inspected for evidence of "varnish" formation thereon. "Varnish" values are based on the visual rating in which a glass rod free of any "varnish" is given a rating of 10 and a rod heavily coated with "varnish" is given a rating of 1. Rods having appearances between these extremes are given intermediate values. A motor oil of S. A. E. 20 specifications and this oil containing 0.25% of the above described KOH-polymer product when tested in the above manner gave the following results:

TABLE I

STIRRING OXIDATION TEST

| Oil | Viscosity increase [1] | Sludge mg./10 g. oil | | Acidity mg. KOH/g. oil | | Varnish [2] | |
|---|---|---|---|---|---|---|---|
| | 48 hrs. | 24 hrs. | 48 hrs. | 24 hrs. | 48 hrs. | 24 hrs. | 48 hrs. |
| Control | 1320 | 8 | 800 | 5.5 | 16.5 | 6 | 1 |
| Control+0.25% KOH-polymer product | 160 | 13 | 56 | 5.0 | 5.6 | 10 | 9 |

[1] Saybolt Universal viscosity at 100° F.
[2] Rating scale: 10=no deposit
1=very heavy deposit The above data show the marked improvement obtained upon the addition of as little as 0.25% of the KOH-polymer product to a motor oil.

The effectiveness of our addition agent is further demonstrated by the data obtained in the following engine tests. This accelerated engine test was made in a standard six cylinder spark-ignition engine operating for sixty hours at 35 B. H. P. and 3000 R. P. M. and an oil sump temperature of about 285° F. At the end of the test period the engine was dismantled and given a visual rating. In this visual rating a value of 10 means that the engine has the appearance of the engine at the start of the test, and a value of 1 means that the engine after the test showed extensive deposits of sludge, varnish etc. Engines having appearances between these extremes are given intermediate rating values. An engine lubricated with a good conventional motor oil for a sixty hour period usually merits a visual rating of about 5. In Table II are tabulated data obtained with a conventional S. A. E. 20 motor oil and the same oil +0.5% of the above described KOH-polymer product.

TABLE II

ACCELERATED ENGINE TEST

*Visual engine rating at end of 60 hours*

| Oil | Piston varnish | Sludge deposits | Ring belt carbon | Under crown carbon | Overall rating |
|---|---|---|---|---|---|
| Control | 5 | 4 | 7 | 4 | 5.0 |
| Control+0.5% KOH-polymer product | 8 | 10 | 10 | 9+ | 9.3 |

The above data show that the engine lubricated with the oil containing the KOH-polymer product was substantially as clean after the test as at the start of the test.

The oxidation inhibiting effect of the KOH-polymer product is shown by the data in Table III in which are tabulated inspections of the oils at the termination of the above described engine tests.

TABLE III

*Oil deterioration at end of 60 hour engine test*

| | Viscosity increase [1] | Acidity mg. KOH/g. oil | Per cent carbon residue | Sludge mg./10 g. oil |
|---|---|---|---|---|
| Control | 925 | 14.5 | 2.93 | 297 |
| Control+0.5% KOH-polymer product | 523 | 3.5 | 2.32 | 111 |

[1] Saybolt Universal viscosity at 100° F.

The data in the foregoing tests demonstrate the effectiveness of the hereindescribed new and novel composition of matter in improving the stability of lubricating oils to which it is added, and their effectiveness in inhibiting the formation of undesirable deposits in internal combustion engines.

As aforesaid, the product above described may be employed to advantage in conjunction with the reaction product of a phosphorus sulfide and any hydrocarbon in general or in conjunction with the reaction product of a phosphorus sulfide and an olefin polymer, preferably a mono-olefin polymer. These products may be obtained by reacting a phosphorus sulfide, such as $P_2S_3$, $P_2S_5$, $P_4S_7$, $P_4S_3$, etc., preferably $P_2S_5$, with a hydrocarbon or with an olefin polymer, preferably a mono-olefin polymer of the type hereinabove described, at a temperature of from about 200° F. to about 500° F., and preferably from 300° F. to about 400° F., preferably in an non-oxidizing atmosphere, such as an atmosphere of nitrogen. From about 1% to about 50% and preferably from about 5% to about 25% of the phosphorus sulfide may be used. It is preferable to use an amount of phosphorus sulfide that will completely react with the polymer, for example 10%, so that no further purification is necessary. However, if excess phosphorus sulfide is used it may be separated from the product after the reaction is completed by filtering or by diluting with a solvent, such as hexane, filtering, and distilling off the solvent. If desired the reaction product may be blown, at a temperature of from about 200° F. to 600° F. and preferably from about 300° F. to about 400° F. with nitrogen, ammonia or steam to improve its odor.

The following specific example will illustrate the preparation of a $P_2S_5$-polymer reaction product. An isobutylene polymer, having a Saybolt Universal viscosity at 210° of about 3000 seconds, was reacted with $P_2S_5$ at a temperature of 300° F. to 325° F. and the product diluted in hexane. After settling, the hexane solution was filtered and the hexane evaporated from the filtrate. The final reaction product had a sulfur content of about 1% and a phosphorus content of about 4%.

One percent of the above $P_2S_5$-polymer reaction product and 0.25% of the above described KOH-polymer product were added to a conventional SAE 20 motor oil and the blended oil subjected to the above described "Stirring oxidation test." The results of the test are tabulated in the following Table IV.

TABLE IV

STIRRING OXIDATION TEST

| | Viscosity increase[1] | Sludge mg./10 g. oil | | Acidity mg. KOH/g. oil | | Varnish | |
|---|---|---|---|---|---|---|---|
| | 48 hours | 24 hours | 48 hours | 24 hours | 48 hours | 24 hours | 48 hours |
| Control | 1,320 | 8 | 800 | 5.5 | 16.5 | 6 | 1 |
| Control+0.25% KOH-polymer 1.0% $P_2S_5$-polymer | 60 | 0 | 16 | 1.2 | 2.6 | 10 | 10 |

[1] Saybolt Universal viscosity at 100° F.

The above data demonstrate the marked inhibiting effect of the combination of KOH-polymer product and the $P_2S_5$-polymer reaction product.

The effect of our combined additives in inhibiting corrosion to lead bearings is demonstrated by the following data shown in Table V. These data were obtained by placing lead strips in a typical motor oil and in the same oil containing small amounts of our additives and noting the loss in weight at stated intervals. In this test 250 cc. of the oil to be tested is placed in a 500 cc. glass beaker, the strips suspended in the oil and the oil heated to 330° F.-332° F. while being agitated by means of a stirrer. At intervals, the strip is removed from the oil, washed, and weighed. After each determination of the corrosion loss the strip is polished and reweighed before being replaced in the oil. The strips used had a surface area of seven square centimeters.

TABLE V

| | Corrosion loss—mgs./strip | | | | | |
|---|---|---|---|---|---|---|
| | 0-1 hours | 1-2 hours | 2-3 hours | 3-4 hours | 4-20 hours | Total hours 0-20 |
| Control | 0.7 | 4.8 | 89 | 116 | 1,915 | 2,126 |
| Control +2.0% A[1] +0.25% B[2] | 1.7 | 3.0 | 0.9 | 1.2 | 2.8 | 12.6 |

[1] Additive A was prepared by treating an isobutylene polymer bottom as above described, with 33% of $P_2S_5$ at a temperature of about 320° F. for above five hours. The product contained 2.85% phosphorus and 6.4% sulfur.
[2] Additive B was prepared by treating a mixture of KOH and an isobutylene polymer distillate having a viscosity range of a 30 S. A. E. motor oil at a temperature of about 340° F. for about 20 hours with very vigorous mechanical stirring.

These data demonstrate the corrosion inhibiting effect of the combination of the phosphorus sulfide-polymer reaction product and the KOH-polymer product.

The effectiveness of the combination of the hereindescribed products in increasing the stability of lubricating oils to which it is added, in use in internal combustion engines is shown by the data in Table VI, which were obtained in an accelerated engine test of the type described above. In the test the oils used were a conventional SAE 20 motor oil, and the same oil containing 2% of the $P_2S_5$-isobutylene polymer reaction product and 0.1% of the KOH-isobutylene polymer product.

TABLE VI

ACCELERATED ENGINE TEST

*Visual engine rating at end of 60 hours*

| | Piston varnish | Sludge deposits | Ring belt carbon | Under crown carbon | Overall rating |
|---|---|---|---|---|---|
| Control | 5 | 4 | 7 | 4 | 5.0 |
| Control+0.1% KOH-polymer product +2.0% $P_2S_i$-polymer product | 10 | 10 | 10 | 10 | 10 |

The above data show that the engine lubricated with the oil containing our additives was substantially as "clean" after the test as at the start of the test.

The oils at the termination of the 60 hour test had the inspections tabulated in Table VII.

TABLE VII

*Oil inspection at termination of 60 hour test*

| | Viscosity increase [1] | Acidity mg. KOH /g. oil | Percent carbon residue | Sludge mg./10 g. oil |
|---|---|---|---|---|
| Control | 554 | 14.5 | 2.93 | 297 |
| Control+additives | 51 | 2.2 | 1.85 | 27 |

[1] Saybolt Universal viscosity at 100° F.

The above data show that the oil containing the hereindescribed additives was substantially more resistant to deterioration than was the control.

While we have described the use of our additives in lubricating oils, our invention is not limited to such use, since these products may be employed in other petroleum products such as insulating oils, greases, waxes and the like to increase the resistance thereof to oxidation, sludging and to inhibit the tendency thereof to corrode metals.

While we have described preferred embodiments of our invention, other modifications thereof may be made without departing from the scope and spirit of the invention, and we do not wish to limit our invention to the examples set forth herein except insofar as the same is defined by the following claims.

We claim:

1. A new composition of matter comprising a petroleum fraction and the product obtained by heating at a temperature above about 200° F. a polymer of an olefin hydrocarbon with a basic compound having a metal constituent said basic compound being dispersed in said polymer.

2. A new composition of matter comprising a petroleum fraction and the product obtained by heating at a temperature above about 200° F. a polymer of a mono-olefin hydrocarbon with a basic compound having a metal constituent said basic compound being dispersed in said polymer.

3. A new composition of matter comprising a petroleum fraction and the product obtained by heating at a temperature above about 200° F. a hydrocarbon polymer containing isobutylene polymers with potassium hydroxide said potassium hydroxide being dispersed in said hydrocarbon polymer.

4. A lubricant comprising a mineral oil and a small amount of the product obtained by heating at a temperature above about 200° F. a polymer of an olefinic hydrocarbon with a basic compound having a metal constituent said basic compound being dispersed in said polymer.

5. A lubricant comprising a mineral oil and a small amount of the product obtained by heating at a temperature above about 200° F. with rapid stirring, a polymer of mono-olefinic hydrocarbons with a basic reagent having a metal constituent said basic reagent being dispersed in said polymer.

6. In a lubricant as described in claim 5 in which the basic reagent is an alkali metal hydroxide.

7. A lubricant comprising a mineral oil, and a small amount of the product obtained by heating at a temperature above about 200° F. with rapid stirring, an isobutylene polymer with an alkali metal hydroxide dispersed therein.

8. The method of inhibiting the deterioration of a mineral oil and the formation of sludge, carbon and varnish in an internal combustion engine during use comprising adding to a mineral lubricating oil normally susceptible to deterioration in internal combustion engines during use a small amount of the product obtained by heating at a temperature above about 200° F. with rapid stirring, a polymer of olefinic hydrocarbons with a basic compound having a metal constituent said basic compound being dispersed in said polymer.

9. The method of inhibiting the deterioration of a mineral oil and the formation of sludge, carbon, and varnish in an internal combustion engine during use comprising adding to a mineral lubricating oil normally susceptible to deterioration in internal combustion engines during use a small amount of the product obtained by heating at a temperature above about 200° F. with rapid stirring, a polymer of mono-olefinic hydrocarbons with a basic compound having a metal constituent said basic compound being dispersed in said polymer.

10. The method as described in claim 9 in which the polymer of mono-olefinic hydrocarbons contains a polymer of isobutylene.

11. The method of inhibiting the deterioration of a mineral lubricating oil and the formation of sludge, carbon and varnish in an internal combustion engine during use comprising adding to said lubricating oil from about .001% to about 10% of the product obtained by heating at a temperature above about 200° F. with rapid stirring, an isobutylene polymer with potassium hydroxide dispersed in said polymer.

12. An improved lubricant comprising a mineral lubricating oil and in combination therewith a small amount of the phosphorus and sulfur containing reaction product of a phosphorus sulfide and a polymer of an olefin hydrocarbon and a small amount of the product obtained by heating at a temperature above about 200° F. a polymer of an olefin hydrocarbon with a basic compound having a metal constituent said basic compound being dispersed in said polymer.

13. An improved lubricant comprising a mineral lubricating oil and in combination therewith a small amount of the phosphorus and sulfur-containing reaction product of a phosphorus sulfide and a polymer of a mono-olefin hydrocarbon and a small amount of the product obtained by heating at a temperature above about 200° F. a polymer of a mono-olefin hydrocarbon with a basic compound dispersed therein, said compound being selected from the group consisting of metal oxides, metal hydroxides and metal carbonates.

14. An improved lubricant comprising a mineral lubricating oil and in combination therewith a small amount of the phosphorus and sulfur-containing reaction product of a phosphorus sulfide and a co-polymer obtained by the polymerization of a hydrocarbon mixture containing low molecular weight iso-olefins and normal olefins and a small amount of the product obtained by heating at a temperature above about 200° F., a polymer of a mono-olefin hydrocarbon with a basic compound having a metal constituent said basic compound being dispersed in said polymer.

15. An improved lubricant comprising a mineral lubricating oil and in combination therewith a small amount of the phosphorus and sulfur-containing reaction product of a phosphorus sulfide and a tetramer obtained by the copolymerization of a hydrocarbon mixture containing isobutylene and normal butylene and a small amount of the product obtained by heating at a temperature above about 200° F., said tetramer with an alkali metal hydroxide dispersed therein.

16. An improved lubricant comprising a mineral lubricating oil and in combination therewith a small amount of the phosphorus and sulfur-containing reaction product of a phosphorus sulfide and an isobutylene polymer, and a small amount of the product obtained by heating at a temperature above about 200° F., an isobutylene polymer with an alkali metal hydroxide dispersed therein.

17. An improved lubricant comprising a mineral lubricating oil as described in claim 16 in which the isobutylene polymer is obtained by polymerizing isobutylene as a temperature of about 0° F. to about 100° F. in the presence of boron fluoride.

18. An improved lubricant comprising a mineral lubricating oil as described in claim 16 in which the phosphorus sulfide is phosphorus pentasulfide and the alkali metal hydroxide is potassium hydroxide.

19. The method of inhibiting the deterioration of a mineral lubricating oil and the formation of sludge, carbon and varnish in an internal combustion engine during use comprising adding to a mineral lubricating oil normally susceptible to deterioration in an internal combustion engine during use a small amount of the phosphorus and sulfur-containing reaction product of a phosphorus sulfide and an isobutylene polymer obtained by polymerizing isobutylene at a temperature of about 0° F. to about 100° F. in the presence of boron fluoride and a small amount of the product obtained by heating at a temperature above about 200° F., with rapid stirring, said isobutylene polymer with an alkali metal hydroxide dispersed therein.

20. The method of inhibiting the deterioration of a mineral lubricating oil and the formation of sludge, carbon and varnish in an internal combustion engine during use, comprising adding to a mineral lubricating oil normally susceptible to deterioration in internal combustion engines during use a small amount of a phosphorus and sulfur-containing reaction product of a phosphorus sulfide and a polymer obtained from a mixture of polymerized $C_4$ mono-olefins and $C_4$ paraffins and a small amount of the product obtained by heating at a temperature above about 200° F., a polymer of olefinic hydrocarbons with an alkali metal hydroxide dispersed therein.

21. The method of inhibiting the deterioration of a mineral lubricating oil and the formation of sludge, carbon and varnish in internal combustion engines during use comprising adding to a mineral lubricating oil normally susceptible to deterioration in internal combustion engines during use from about 0.001% to about 10% of the phosphorus and sulfur-containing reaction product of $P_2S_5$ and an isobutylene polymer obtained from isobutylene polymerized at a temperature of about 32° F. in the presence of boron fluoride and from about 0.001% to about 10.0% of the product obtained by heating at a temperature above about 200° F. with rapid stirring, said isobutylene polymer with KOH dispersed therein.

22. An improved lubricant comprising a mineral lubricating oil and in combination therewith a small amount of the phosphorus and sulfur-containing reaction product of a phosphorus sulfide and hydrocarbons and a small amount of the product obtained by heating at a temperature above about 200° F., a polymer of an olefin hydrocarbon with a basic compound having a metal constituent said basic compound being dispersed in said polymer.

23. A new composition of matter comprising a lubricating oil and the product obtained by heating at a temperature above about 200° F. a polymer of an olefin hydrocarbon with a basic reagent dispersed therein.

24. A new composition of matter comprising a lubricating oil and the product obtained by heating at a temperature above about 200° F. with rapid stirring a polymer of an olefin hydrocarbon with a basic compound having a metal constituent, said basic compound being dispersed in said polymer.

25. A new composition of matter comprising a lubricating oil and the product obtained by heating at a temperature above about 200° F. with rapid stirring a polymer of a mono-olefin hydrocarbon with potassium hydroxide dispersed therein.

26. A new composition of matter comprising a lubricating oil and the product obtained by heating at a temperature above about 200° F. a polymer of a mono-olefin hydrocarbon with sodium hydroxide dispersed therein.

27. A new composition of matter comprising a lubricating oil and the product obtained by heating at a temperature above about 200° F. with rapid stirring a polymer of a mono-olefin hydrocarbon with calcium oxide dispersed therein.

28. A new composition of matter comprising a hydrocarbon oil and in combination therewith a phosphorus and sulfur-containing reaction product of a phosphorus sulfide and a polymer of an olefin hydrocarbon and the product obtained by heating at a temperature above about 200° F. a polymer of an olefin hydrocarbon with a basic compound having a metal constituent, said basic compound being dispersed in said polymer.

29. A new composition of matter as described in claim 28 in which the polymer is a polymer of a mono-olefin hydrocarbon.

30. A new composition of matter as described in claim 28 in which the basic compound is potassium hydroxide.

31. A new composition of matter as described in claim 28 in which the basic compound is sodium hydroxide.

32. A new composition of matter comprising a hydrocarbon oil and in combination therewith a phosphorus and sulfur-containing reaction product of a phosphorus sulfide and a copolymer of low molecular weight iso-olefins and normal olefins and the product obtained by heating at a temperature above about 200° F. a polymer of a mono-olefin hydrocarbon with a basic compound having a metal constituent, said basic compound being dispersed in said copolymer.

CLARENCE M. LOANE.
JAMES W. GAYNOR.